Figure 1:
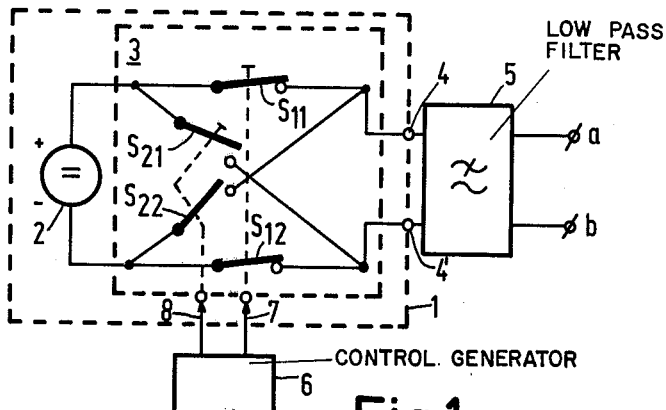

United States Patent [19]

Brockmann

[11] 4,192,975

[45] Mar. 11, 1980

[54] SUPPLY-ARRANGEMENT FOR A LINE CIRCUIT

[75] Inventor: Klaus-Dieter K. Brockmann, Hilversum, Netherlands

[73] Assignee: U.S. Philips Corporation, New York, N.Y.

[21] Appl. No.: 912,454

[22] Filed: Jun. 5, 1978

[30] Foreign Application Priority Data

Feb. 6, 1978 [NL] Netherlands .......................... 7802423

[51] Int. Cl.² ............................................ H04M 19/00
[52] U.S. Cl. .................................. 179/77; 179/18 HB; 179/70
[58] Field of Search ................ 179/70, 77, 99, 18 FA, 179/16 EC, 18 F, 18 HB; 363/127, 128; 307/1, 2, 3, 43

[56] References Cited

U.S. PATENT DOCUMENTS

| | | | |
|---|---|---|---|
| 3,376,494 | 4/1968 | Wilkinson | 363/128 |
| 3,683,118 | 8/1972 | Vago et al. | 179/18 HB |
| 3,965,447 | 6/1976 | Thomas | 179/81 R |
| 4,021,721 | 5/1977 | Tachibana | 363/128 |
| 4,115,660 | 9/1978 | Croisier et al. | 179/18 HB |

*Primary Examiner*—Robert S. Tupper
*Assistant Examiner*—Randall P. Myers
*Attorney, Agent, or Firm*—Thomas A. Briody; William J. Streeter; Bernard Franzblau

[57] ABSTRACT

A supply arrangement for a subscriber's line circuit comprising a high frequency pulse source provided with switching means, controlled by a control generator for controlling the mark-space ratio of the high frequency pulse source. By the choice of the mark-space ratio, d.c. voltages of any desired level as well as a.c. voltages can be supplied to the subscriber's line.

8 Claims, 5 Drawing Figures

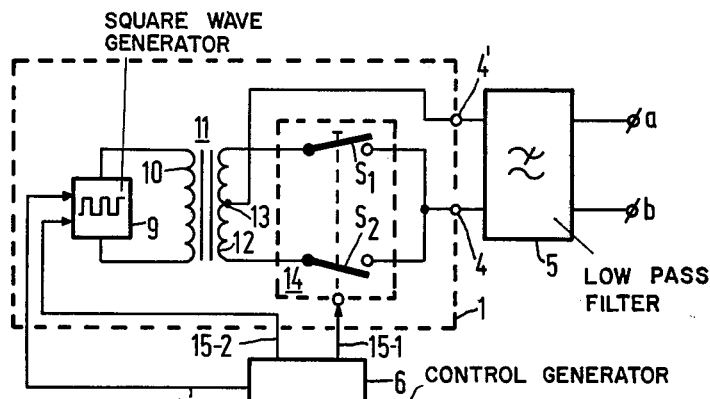
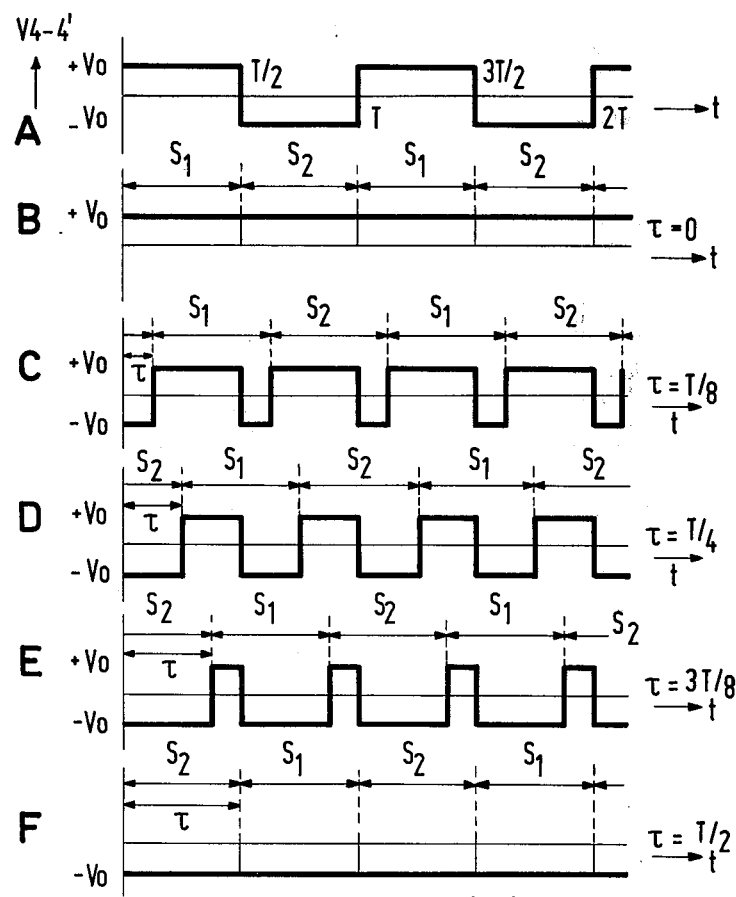
Fig.3
Fig.4

SUPPLY-ARRANGEMENT FOR A LINE CIRCUIT

The invention relates to a supply arrangement for a line circuit of a telephone system, comprising a high frequency pulse source provided with switching means and having an output coupled to a two-wire subscriber's line via a low-pass filter having a cut-off frequency which is low relative to the frequency of the pulse source.

Such a supply arrangement is disclosed in U.S. Pat. No. 3,965,447.

As known, a supply arrangement for a line circuit must not only be able to supply d.c. voltages to the subscriber's line but also a.c. voltages, for example the ringing voltage, To this end the supply arrangement according to the U.S. Pat. No. 3,965,447 comprises an a.c. voltage generator which is connected via an inductance to the centre tap of the primary winding of a transformer included in the high frequency pulse source.

It is an object of the invention to provide a supply arrangement of the type defined above by means of which not only a d.c. voltage of any desired level but also a.c. voltages are supplied in a simple manner to the subscriber's line and by means of which it is possible to reverse the polarity of the d.c. voltage on the subscriber's line without additional switching means and to make the line current completely currentless by means of loop interruptions, which is important, for example, when a connection to a trunk exchange must be built up.

According to the invention a supply arrangement of the type defined above is characterized in that a control signal generator is provided for supplying control signals to the switching means for controlling the mark-space ratio of the high frequency pulse source.

An advantageous embodiment of the supply arrangement according to the invention is characterized in that the high frequency pulse source comprises a square-wave generator having a fixed mark-space ratio and in that the control signals supplied by the control generator open and close the switching means in a certain phase relationship to the output voltage of the square-wave generator. This achieves the useful result that at least part of the high frequency pulse source, namely the square-wave generator, can be used in common for a plurality of line currents.

Figure 2:
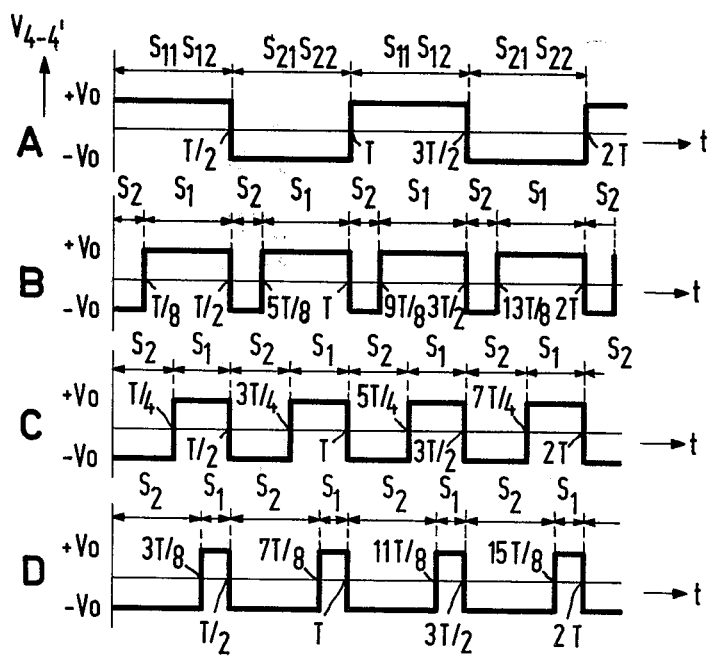
Figure 5:
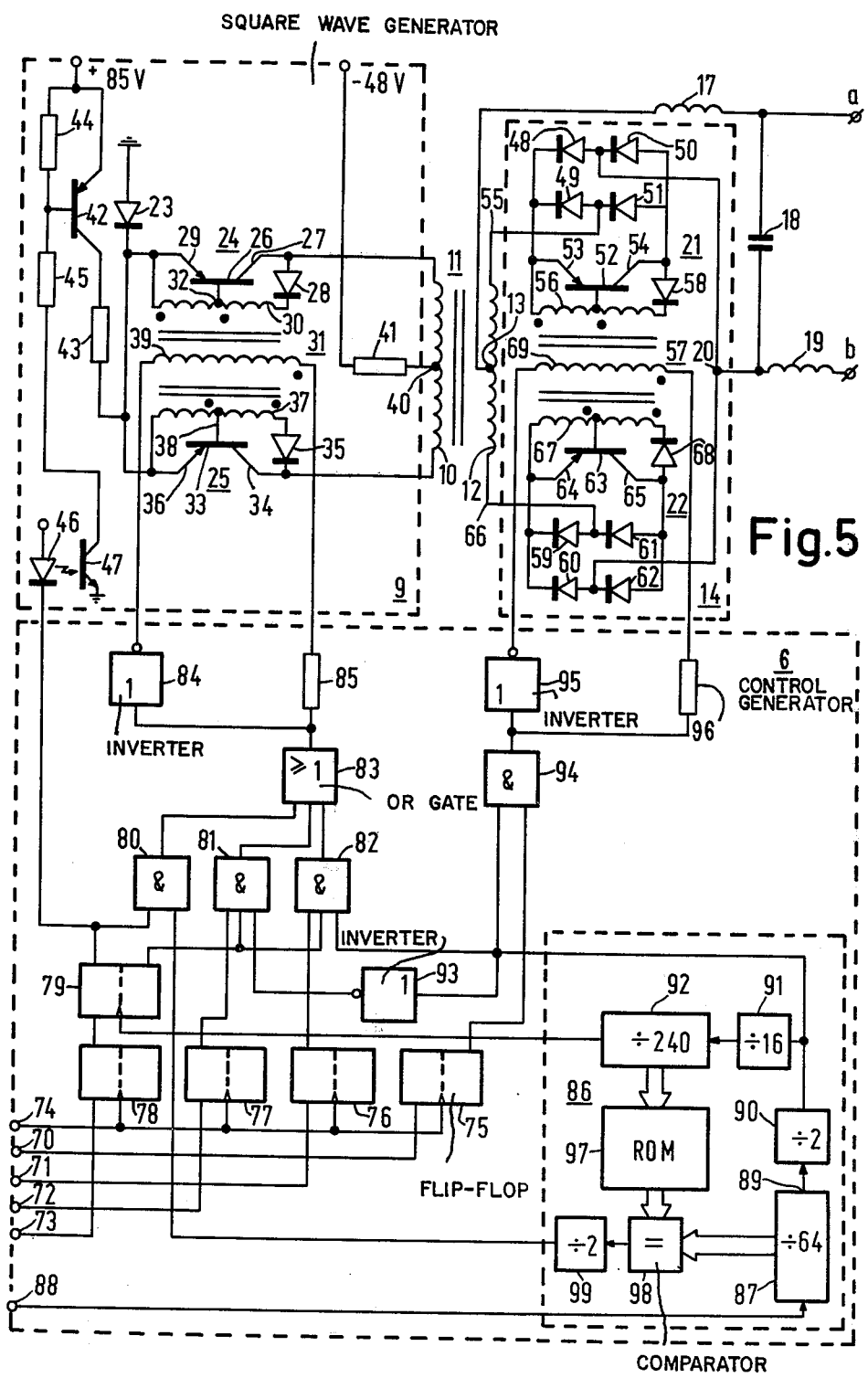

Embodiments of the supply arrangement according to the invention will be explained below in greater detail with reference to the drawing, in which:

FIG. 1 shows a supply arrangement for illustrating the principle on which the invention is based;

FIG. 2 consisting of A-D, shows some voltage-time diagrams for illustrating the operation of the supply arrangement of FIG. 1;

FIG. 3 shows an embodiment of a supply arrangement according to the invention;

FIG. 4 consisting of A-F, shows some voltage-time diagrams for illustrating the operation of the supply arrangement of FIG. 3; and FIG. 5 shows a detailed embodiment of the supply arrangement of FIG. 3.

Corresponding elements in the different Figures have been given the same reference numerals.

The supply arrangement shown in FIG. 1 for a line circuit comprises a high frequency pulse source 1 in which a d.c. voltage source 2 and switching means 3 are incorporated. The output 4-4' of the high frequency pulse source 1 is connected via a low-pass filter 5 to the a-wire and b-wire of the subscriber's line. In accordance with the invention a control signal generator 6 is also present for supplying control signals which are supplied to the switching means 3 via the line 7 and 8. The switching means 3 comprise two sets of switches $S_{11}$, $S_{12}$, and $S_{22}$, respectively, which are operated by the control signals applied via the lines 7 and 8, respectively.

It should be noted that the d.c. voltage source 2 can be replaced by a current source in which case the low-pass filter 5 is constituted by the input capacitance of the subscriber's line.

The operation of the supply arrangement shown in FIG. 1 will be explained with reference to the voltage-time diagrams shown in FIGS. 2A-D. These diagrams show how the voltage at the output 4-4' of the pulse source 1 changes with time as the result of the alternate closing of the two sets of switches $S_{11}$, $S_{12}$ and $S_{21}$ and $S_{22}$, respectively, $V_o$ being the voltage supplied by the d.c. voltage source 2. In FIG. 2A switches $S_{11}$ and $S_{12}$ are closed for $0 < t < T/2$, the switches $S_{21}$ and $S_{22}$ for $T/2 < t < T$ etc. In FIG, 2B the switches $S_{21}$ and $S_{22}$ (denoted by $S_2$) are closed for $0 < t < T/8$, the switches $S_{11}$ and $S_{12}$ (denoted by $S_1$) for $T/8 < t < T/2$ etc. It should be noted that a positive d.c. voltage having a value $V_o$ is produced across the output 4-4' by keeping the switches $S_{11}$ and $S_{12}$ closed and a negative d.c. voltage when the switches $S_{21}$ and $S_{22}$ are kept closed.

In accordance with the above the mark-space ratio of the high frequency pulse source 1 is controlled by controlling the switching means 3. The term mark-space ratio used here has a given relationship to the English expression "duty cycle."

Supplying an a.c. voltage of, for example 25 Hz to the a-wire and the b-wire can now be done alternately opening and closing the two sets of switches with a high frequency of, for example, 96 kHz and by sinusoidally varying the time per period during which a given set of switches is closed at a frequency of 25 Hz. If the low-pass filter 5 then has a cut-off frequency of, for example, 100 Hz the voltage between the a-wire and the b-wire will be a sinusoidal a.c. voltage having a frequency of 25 Hz.

In the embodiment shown in FIG. 3 of a supply arrangement according to the invention the high frequency pulse source 1 comprise a square-wave generator 9, having a fixed mark-space ratio of 100% which is connected to the primary winding 10 of a transformer 11. The secondary winding 12 has a centre tap 13 which is directly connected to the output terminal 4' while the two ends of the secondary winding 12 are connected to the output terminal 4 via switching means 14. Tthe switching means 14 comprise two switching branches including a switch $S_1$ and a switch $S_2$, respectively, which are alternately opened and closed under the control of a control signal applied thereto by the control signal generator 6 via a line 15-1. A control signal is also supplied via a line 15-2 to the square-wave generator 9. Said control signals serve for controlling the mutual phase relationship between the switching frequency and the pulse frequency of the source. In this embodiment the control signal generator 6 supplies, in addition, an adjusting signal to the square-wave generator 9 via a line 16 for adjusting the amplitude of the voltage to be supplied by the square-wave generator 9.

The operation of the supply arrangement according to the invention, shown in FIG. 3, is further explained with reference to FIG. 4A–F. FIG. 4A shows the variation of the output voltage of the square-wave generator 9, the frequency 1/T being high, for example 96 kHz. The voltage shown in FIG. 4A is also the voltage at the output 4–4' of the pulse source 1, if switch $S_1$ is closed and switch $S_2$ is open. FIGS. 4B–F show the variation of the voltage at the output 4–4' for different values of the phase shift, denoted by $\tau$, between the closure of switch $S_1$ and the raising edge of the voltage supplied by the square-wave generator 9. $S_1$ and $S_2$, respectively, indicate in FIG. 4 that switch $S_1$ and switch $S_2$, respectively, is closed.

In the same manner as stated in the description of FIG. 1 a low frequency a.c. voltage can be put on the subscriber's line by a low frequency sinusoidal variation of the phase $\tau$. If $\tau$ varies sinusoidally around a value deviating from T/4, the low frequency a.c. voltage will have been superimposed on a d.c. voltage component which differs from zero.

FIG. 5 shows a detailed embodiment of a supply arrangement according to the invention. Therein the high frequency pulse source comprises a square-wave generator 9 connected to the primary winding 10 of a transformer 11. The switching means 14 are connected to the secondary winding 12 of the transformer 11. The centre tap 13 of the secondary winding 12 is connected to the a-wire of a two-wire subscriber's line via a low-pass filter constituted by an inductance 17 and a capacitor 18. Via an inductance 19 the b-wire is connected to the node 20 of the two switching branches 21 and 22 which constitute the switching means 14. The square-wave generator 9 comprises a diode 23 the anode of which is connected to ground and the cathode to the common point of two switching branches 24 and 25. Switching branch 24 comprises a PNP transistor 26 whose collector 27 is connected to the anode of a diode 28. A secondary winding 30 of a transformer 31 is included between the emitter 29 of transistor 26 and the cathode of diode 28, the centre tap 32 of secondary winding 30 being connected to the base of transistor 26. Switching branch 25 also comprises a PNP transistor 33 whose collector 34 is connected to the anode of a diode 35. A secondary winding 37 of the transformer 31 is included between the emitter 36 of the transistor 33 and the cathode of diode 35. A centre tap 38 of secondary winding 37 is connected to the base of transistor 33. Control signals are applied to the primary winding 39 of transformer 31 by a control signal generator 6 for opening and closing the switching branches 24 and 25. The secondary winding 30 of transformer 31 has a winding sense which is opposite to the winding sense of the primary winding 39, while the secondary winding 37 is wound in the same direction as the primary winding 39. The collector 27 of transistor 26 and the collector 34 of transistor 33 are each connected to an end of the primary winding 10 of transformer 11. A centre tap 40 of the primary winding 10 is connected via a resistor 41, which supplies the major part of the required impedance of 800 Ohm of the supply arrangement, to a source having a fixed potential of −48 Volts.

The common point of the two switching branches 24 and 25 is connected to a source having a fixed potential of +85 Volts via a PNP transistor 42 whose collector lead includes a resistor 43. Transistor 42 can be controlled via a voltage divider implemented from the resistors 44 and 45 connected between the +85 Volts source and ground and by means of a switching signal which is supplied via a light-emitting diode 46 and a phototransistor 47.

The switching branch 21 included in the switching means 14 comprises a diode bridge constituted by the diodes 48, 49, 50 and 51, as well as a PNP transistor 52 whose emitter 53 is connected to the cathodes of the diodes 48 and 49 and the collector 54 of which is connected to the anodes of the diodes 50 and 51. The junction of the diodes 49 and 51 is connected to an end 55 of the secondary winding 12 of transformer 11 and the junction of the diodes 48 and 50 is connected to the node 20 of the two switching branches 21 and 22. The emitter 53 of transistor 52 is connected to an end of the secondary winding 56 of a transformer 57 while the collector 54 of transistor 52 is connected via a diode 58 to the other end of the secondary winding 56.

Switching branch 22 also comprises a diode bridge constituted by the diodes 59, 60, 61 and 62, as well as a PNP-transistor 63 whose emitter 64 is connected to the cathodes of the diodes 59 and 60, The collector 65 of transistor 63 is connected to the anodes of the diodes 61 and 62. The junction of the diodes 59 and 61 is connected to the other end 66 of the secondary winding 12 of transformer 11 and the junction of the diodes 60 and 62 is connected to the node 20 of the two switching branches 21 and 22. The emitter 64 of transistor 63 is connected to an end of a secondary winding 67 of transformer 57, while the collector 65 of transistor 63 is connected to the other end of the secondary winding 67 via a diode 68. Control signals from the control signal generator 6 are applied to the primary winding 69 of transformer 57. The diodes 28, 35, 58 and 68 function to keep the transistors 26, 33, 52 and 63 out of the saturated state.

The control signal generator 6 comprises four selection inputs 70, 71, 72 and 73 to which selection pulses are applied originating from a central control device, not shown, by means of which pulses a certain desired voltage state is selected for the subscriber's line. The presence of a selection pulse at input 70 indicates that the subscriber's line must be made currentless, the presence of a pulse at input 71 indicates that the normal supply voltages of −48 Volts must be applied between the a-wire and the b-wire, a pulse at input 72 that the polarity of the voltage at the subscriber's line must be inverted and the presence of a selection pulse at input 73 indicates that a ringing a.c. voltage must be supplied to the subscriber's line.

A clock signal is applied via input 74 to the control signal generator 6 for transferring to the D-inputs of the D-flipflops 75, 76, 77 and 78 selection pulses originating from the selection inputs 70, 71, 72 and 73.

In addition, the control signal generator 6 comprises a D-flipflop 79, whose D-input is connected to the non-inverting output of flipflop 78 and whose non-inverting output supplies the setting signal for the square-wave generator 9. This setting signal is also applied to an input of an AND-gate 80, while the inverting output of flipflop 79 is connected to AND-gates 81 and 82. The non-inverting outputs of the flipflops 76 and 77 are connected to inputs of the AND-gates 82 and 81, respectively. The outputs of the AND-gates 80, 81 and 82 are connected to inputs of an OR-gate 83 having an output connected on the one hand via an inverter 84 and on the other hand via a resistor 85 to the ends of the primary winding 39 of transformer 31 for controlling the switching branches 24 and 25.

The control signal generator 6 also comprises a sine-wave signal generator 86 having a divide-by-64 divider 87 to the input of which a clock signal having a frequency of 12,288 kHz, originating from a clock input 88 of the control signal generator 6, is applied. Connected to the output 89 of the divide-by-64 divider 87 there is a divide-by-two divider 90, at the output of which a pulse-shaped signal having a frequency of 96 kHz occurs which is applied to an input of the AND-gate 82 and which is, furthermore, converted via a divide-by-16 divider 91 and a divide-by-240 divider 92 into a synchronisation signal having a frequency of 25 Hz which is applied to the clock input of D-flipflop 79. The pulse-shaped signal occurring at the output of the divide-by-two divider 90 is also applied to the AND-gate 81, via an inverter 93, and directly to an input of an AND-gate 94, the other input of which is connected to the inverting output of flipflop 75. The output of AND-gate 94 is connected via an inverter 95, on the one hand, and via a resistor 96, on the other hand, to the ends of the primary winding 69 of transformer 57 for controlling the switching branches 21 and 22.

The counting position of the divide-by-240 divider 92 is applied by way of address to a ROM 97 in which numbers from 24 to 64 have been stored in such positions that numbers in consecutive positions have sinusoidal relation with the addresses associated with those positions. The ROM 97 passes the addressed numbers on to a comparator 98 which, every time the number corresponds to the counting position of the divide-by-64 divider 87, supplies a pulse to a divide-by-two divider 99 at the output of which a pulse-shaped signal having a frequency of 96 kHz occurs, whose phase is shifted relative to the 96 kHz signal at the output of divide-by-two divider 90. The output of divide-by-two divider 99 is connected to an input of AND-gate 80.

The operation of the supply arrangement according to the invention shown in FIG. 5 can be explained as follows, wherein it should be noted that at the occurrence of a clock pulse at input 74 a selection pulse occurs at only one of the selection inputs 70, 71, 72 and 73. If a pulse is supplied to selection input 70 a logic "B" will occur at the inverting output of flipflop 75 at the occurrence of a clock pulse at input 74, so that the output of AND-gate 94 also is "0." Owing to the presence of a "0" at the D-input of the flipflops 76, 77 and 78 the outputs of AND-gates 80, 81 and 82 will supply a "0" so that the output of OR-gate 83 also is "0." Via inverter 84 and resistor 85 there is then a d.c. voltage across the primary winding 39 of transformer 31 so that the transistors 26 and 33 remain in the cut-off state. In a similar manner the transistors 52 and 63 are kept in the cut-off state via inverter 95 and resistor 96 so that no current can flow through the subscriber's line. In this situation the resistors 85 and 96 function as current limiters for protecting the transistors in the switching branches from break-down and for limiting the power dissipation.

If thereafter a "1" appears at selection input 71, the non-inverting output of flipflop 76 and the inputs connected thereto of AND-gate 82 become "1" at a clock pulse from input 74, while the setting signal at the non-inverting output of flipflop 79 becomes "0" via the flipflops 78 and 79 and a "1" is also applied to the input of AND-gate 82 connected to the inverting output of flipflop 79. Also the input of AND-gate 94, which is connected to the inverting output of flipflop 75, then becomes "1." Then the 96 kHz pulse signal occurring at the output of divide-by-two divider 90 alternately makes the output of AND-gate 94 as well as the outputs of AND-gate 82 and OR-gate 83, in the same rhythm of 96 kHz, "1" and "0." a.c. voltages of equal frequency and phase are then produced across the primary windings of the transformers 31 and 57, which voltages alternately switch the switching branches 24, 21 and 25, 22, respectively simultaneously on, so that, in accordance with the description with reference to FIG. 3 and FIG. 4, a d.c. voltage of −48 Volts is produced between the a-wire and the b-wire.

At the occurrence of a selection pulse at input 72 a "1" is applied to the input of AND-gate 81 connected to flipflop 77 as well as to the input connected to the inverting output of flipflop 79, while the AND-gates 80 and 82 supply a "0" at their outputs. A 96 kHz signal which is of opposite phase to the 96 kHz signal at the output of AND-gate 94 will now appear at the output of OR-gate 83 via inverter 93, so that the switching branches 21, 22 and 24, 25 respectively, are operated in anti-phase and, in accordance with the description with reference to FIG. 3 and FIG. 4, a +48 V d.c. voltage will be maintained between the a-wire and the b-wire.

Applying a selection pulse to input 73 first of all results in a setting signal being supplied via flipflops 78 and 79 make transistor 42 conductive via diode 46 and transistor 47 so that a D.C. voltage of +85 volts appears at the cathode of diode 23 and cuts this diode off. In addition, the outputs of the AND-gates 82 and 81 will be "0" via flipflops 76 and 77, respectively, while AND-gate 94 will supply alternately, at a frequency of 96 kHz, a "1" or a "0". The 96 kHz signal applied to an input of AND-gate 80 and whose phase is shifted relative to the signal occurring at the input of AND-gate 94 results in that a "1" or a "0" occurs alternately at a frequency of 96 kHz at the output of OR-gate 83. The phase shift between the signals at the outputs of OR-gate 83 and AND-gate 94 varies around the value $\tau = T/4$ in accordance with a sine wave having a frequency of 25 Hz, as determined by the sine-wave signal generator 86. In accordance with the previous description with reference to the FIGS. 3 and 4 the voltage between the a-wire and the b-wire will be an a.c. voltage superimposed on a d.c. voltage, the magnitude of the d.c. voltage component being determined by the value of the phase shift around which the phase shift varies sinusoidally. In this case the d.c. voltage component is equal to −48 Volts, so that a voltage varying from $-48+85=+37$ Volts to $-48-85=-133$ Volts is produced between the a-wire and the b-wire.

With reference to the inductance 19 it should be noted that this inductance serves for blocking the speech signals present on the subscriber's line in such a way, however, that the ringing signals having a frequency of 25 Hz are passed.

With reference to resistor 43 in the collector lead of transistor 42 it should be noted that during the ringing condition this resistor must increase the impedance of the supply arrangement to 1200 Ohms to limit the current flowing through the carbon microphone of the called subscriber's set when the receiver is lifted from the hook.

What is claimed is:

1. A supply arrangement for a line circuit of a telephone system, comprising a high frequency pulse source including bipolarity switching means and an output at which high frequency pulses of either positive or negative polarity are produced, means coupling said output to a two-wire subscriber's line via a low-pass filter having a cut-off frequency that is low relative to the frequency of the pulse source, and a control signal generator having an output coupled to said switching means for supplying control signals to the switching means for controlling the mark-space ratio of the pulses produced by the high frequency pulse source.

2. A supply arrangement as claimed in claim 1, wherein the switching means conduct current in either direction and the high frequency pulse source comprises a square-wave generator coupled to the switching means, said square-wave generator having a fixed mark-space ratio, and wherein the control signals supplied by the control signal generator open and close the switching means in a certain phase relationship to the output voltage of the square-wave generator.

3. A supply arrangement as claimed in claim 1 or wherein the control signal generator comprises a sine-wave signal generator which varies the mark-space ratio of the high frequency pulse source so that the voltage between the two wires of the subscriber's line is an a.c. voltage superimposed on a d.c. voltage.

4. A supply arrangement as claimed in claim 3, wherein the control signal generator further comprises means for supplying a setting signal to a setting input of the high frequency pulse source for adjusting the amplitude of the output voltage to be supplied by the pulse source.

5. A supply arrangement as claimed in claim 4, wherein the means for supplying a setting signal are coupled, d.c. isolated, to the setting input of the high frequency pulse source and the high frequency pulse source is fed in the absence of the setting signal from one, and in the presence of the setting signal, from two separate d.c. voltage sources.

6. A supply arrangement as claimed in claims 1 or 2 wherein the control signal generator is d.c. isolated from the high frequency pulse source.

7. A supply arrangement as claimed in claims 1 or 2 wherein the control signal generator further comprises means for modulating the mark-space ratio of the high frequency pulse source with a low frequency A.C. signal that falls within the pass band of said low pass filter.

8. A supply arrangement as claimed in claim 2 wherein the control signal generator further comprises a low frequency sine-wave signal generator coupled to the high frequency pulse source so as to sinusoidally modulate the mark-space ratio of the high frequency pulses produced by the high frequency pulse source by sinusoidally varying the phase shift $\tau$ between the square-wave signal produced by the square-wave generator and the control signals of the control signal generator.

* * * * *

UNITED STATES PATENT AND TRADEMARK OFFICE
CERTIFICATE OF CORRECTION

PATENT NO. : 4,192,975

DATED : March 11, 1980

INVENTOR(S) : Klaus-Dieter K. Brockmann

It is certified that error appears in the above—identified patent and that said Letters Patent is hereby corrected as shown below:

On the Title Page
Item (30) change "Feb" to --Mar--

Signed and Sealed this

Seventh Day of June 1983

[SEAL]

Attest:

DONALD J. QUIGG

*Attesting Officer*   *Acting Commissioner of Patents and Trademarks*